United States Patent

[11] 3,532,073

| [72] | Inventor | Iver L. Nelson |
| | | Minneapolis, Minnesota |
| [21] | Appl. No. | 687,197 |
| [22] | Filed | Dec. 1, 1967 |
| | | Division of Ser. No. 393,569, Sept. 1, 1964, now Pat. No. 3,364,055, Jan. 16, 1968 Oct. 6, 1970 |
| [45] | Patented | Jan. 6, 1970 |
| [73] | Assignee | Hoerner Waldorf Corporation St. Paul, Minnesota a corporation of Delaware |

[54] APPARATUS FOR APPLYING HOT MELT ADHESIVE TO CARTON BLANKS
2 Claims, 4 Drawing Figs.

[52] U.S. Cl. .................................................. 118/324, 118/110
[51] Int. Cl. .................................................. B05b 13/02
[50] Field of Search ........................................ 118/324, 324(CC), 24, 25, 415; 117/102(FC), 105.3; 18/12(DS)

[56] References Cited
UNITED STATES PATENTS
1,976,539  10/1934  Bonniksen ............... 118/324(CC)UX
1,994,269   3/1935  Bonniksen ............... 118/324(CC)UX
2,314,453   3/1943  Mack et al. ............... 117/105.3X
2,963,002  12/1960  Glaus ...................... 118/324(CC)UX
3,299,195   1/1967  Chenoweth et al. ..... 118/324(CC)UX
3,345,972  10/1967  Masulis .................... 118/324(CC)UX
3,421,932   1/1969  McGregor et al. ........ 117/105.3

Primary Examiner—Morris Kaplan
Attorney—Robert M. Dunning

ABSTRACT: A conveyor is provided for conveying flat carton blanks past an adhesive applicator. The applicator is a nozzle directing a continuous stream of viscous hot melt adhesive to selected areas of the blanks, these areas being spaced. A roller is positioned in the path of the adhesive stream on the opposite side of the blanks from the nozzle. Means are provided for removing the adhesive from the roller surface. The roller is driven in a direction opposite the direction of travel of the blanks. When the adhesive hits the roller, it is broken off the trailing surface of the cartons by reverse movement of the roller.

Patented Oct. 6, 1970
3,532,073
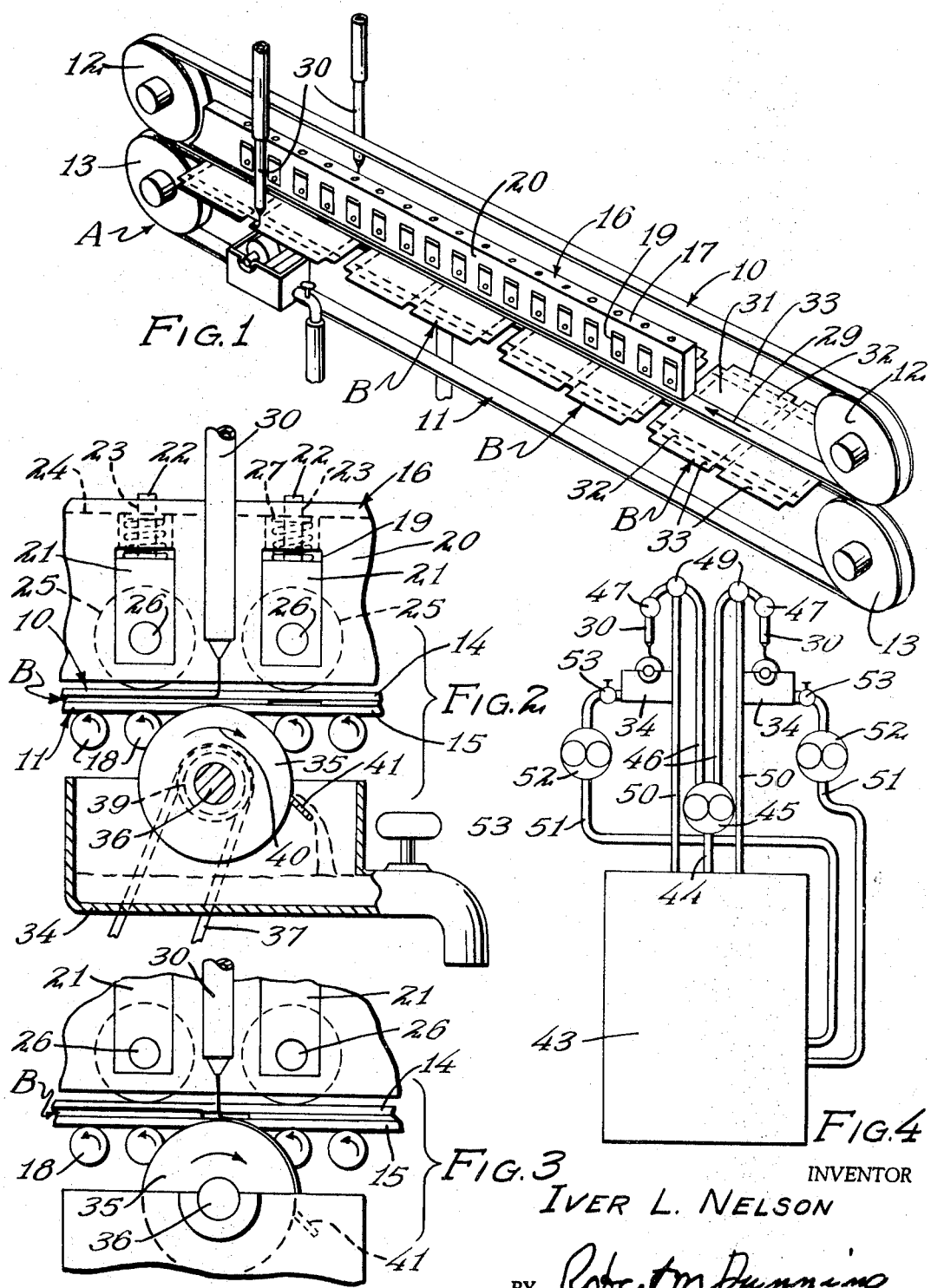
INVENTOR
IVER L. NELSON
BY Robert M Dunning
ATTORNEY

APPARATUS FOR APPLYING HOT MELT ADHESIVE TO CARTON BLANKS

This application is a divisional application of Ser. No. 393,569, filed September 1, 1964 now U.S. Pat. No. 3,364,055.

This invention relates to an improvement in an apparatus for applying hot melt adhesive to carton blanks, and deals particularly with a means for applying the adhesive in a continuous stream to spaced carton blanks.

Hot melt adhesives are well-known to the paperboard industry. The use of such adhesives has increased during recent years due to the increased use of paperboard coated with wax or a polyolefin film. Most adhesives are ineffective for sealing wax-coated surfaces. As a result, it has been usual practice to either omit the coating in the areas being sealed, to remove a portion of the coating in the areas to be sealed, or to heat these areas to the extent necessary to drive the wax or other coating into the paperboard. All such processes add to the expense of the gluing operation. Hot melt adhesives are applied at a temperature which is sufficient to at least partially melt the coating and either to combine with the coating or to drive the coating into the board in forming the seal. Perhaps the biggest difficulty in the use of such adhesives lies in the fact that they are normally very viscous and must be applied under considerable pressure. In other words, the adhesive is sometimes supplied from a heated reservoir through heated conduits and heated nozzles to the surface of the board. Means are provided for automatically cutting off the stream of adhesive by closing the nozzles at intervals when the blank is not beneath the nozzle. Much difficulty is experienced in opening and closing the nozzles at extremely short intervals due to the viscosity of the material being dispensed. Thus, this method of applying hot melt adhesive has usually been quite slow.

It has been found that if a heated receptacle is placed beneath the nozzles to receive the unused adhesive, the nozzles may be held continuously open during the gluing operation. It has been found that if the carton blanks pass the nozzle at sufficient speed, the stream of adhesive breaks off effectively at the edge of the carton blank, and that the speed of movement of the cartons also sever the stream of adhesive quite effectively when the next blank is fed beneath the nozzle. By providing a means of returning the hot melt adhesive to the hot melt reservoir, the excess adhesive may be reclaimed and reused.

A feature of the present invention resides in an apparatus gluing cartons which includes means for feeding the carton blanks in spaced relation beneath adhesive applying nozzles which emit a continuous stream of hot melt adhesive, and catching the adhesive being emitted in a suitable heated receptacle beneath the nozzle during the time no surface of the carton blanks is beneath the nozzle.

A feature of the present invention resides in the use of a device of the type described which includes a roller positioned beneath the nozzle and located so that the areas of the carton blank to which adhesive is to be applied pass between the nozzle and the roller. The roller is rotated at a speed which differs from the speed of travel of the carton. When no portion of a carton blank is between the nozzle and the roller, the stream of adhesive is impinged upon the roller and is scraped therefrom through the use of a suitable doctor blade. The roller tends to break off any threads of adhesive which tend to remain connected to the carton blanks so that all of the excess adhesive is removed. Preferably, the surface of the roller adjoining the carton blanks is traveling in the opposite direction from the direction of movement of the blanks so that any threads of adhesive remaining attached to the blanks are forcefully broken away.

These and other objects and novel features of the present invention will be more clearly and fully set forth in the following specification and claims:

In the drawings forming a part of the specification,

FIG. 1 is a diagrammatic perspective view of a section of a gluing machine showing the general arrangement of parts therein.

FIG. 2 is a diagrammatic side elevational view, partly in section, showing the arrangement of the glue applying nozzles and excess adhesive receiving pot.

FIG. 3 is a view similar to FIG. 2 showing the adhesive being emitted onto the receiving roller.

FIG. 4 is a diagrammatic view showing the adhesive circulating system.

FIG. 1 discloses a section of a gluing machine, the section being indicated in general by the letter A. This section A may be of generally conventional form and acts to convey the spaced carton blanks past a glue applying apparatus. The section A delivers the carton to the folding section of the gluer which is well-known in the art and which is accordingly not disclosed in detail in the drawings.

The glue applying section A includes an upper conveyor belt 10 and a lower conveyor belt 11 supported by pairs of pulleys 12 and 13. The lower reach 14 of the upper belt 10 is arranged in opposed parallel relation to the upper reach 15 of the lower belt 11, the belts being designed to carry the carton blanks B therebetween.

The upper reach 15 of the lower belt 11 travels over a series of supporting rollers 18 and is supported thereby. The lower reach 14 of the upper belt 10 is urged toward the lower belt by a pressure applying unit 16 located between the upper and lower reaches of the upper belt 10. In the particular arrangement illustrated, the pressure applying unit 16 includes an inverted channel-shaped frame 17, the open side of which faces downwardly toward the upper surface of the lower reach 14. Rectangular apertures 19 are provided in regularly spaced relation in the side walls 20 of the U-shaped frame 17, the rectangular apertures in the opposite sides 20 being in opposed relation. U-shaped roller supports 21 which are substantially equal in width to the U-shaped frame 17 are vertically slidable in the rectangular apertures 19. The brackets 21 are held in place by pins 22 extending through apertures 23 in the base 24 of the channel-shaped frame 17. Rollers 25 are supported by pivots 26 extending through opposite sides of the U-shaped brackets 21. Springs 27 are interposed between the closed upper ends of the U-shaped brackets 21 and the base 24 of the channel-shaped frame. These springs 27 exert a downward pressure on the brackets 21 and upon the lower reach 14 of the upper conveyor belt 10, thus urging the belt 10 toward the upper reach 15 of the lower belt 11.

As indicated in FIG. 1 of the drawings, the carton blanks B are held clamped between the conveyor belts 10 and 11, as they travel the length of these belts, being fed into position in spaced relation by the feed section of the gluing machine, which is conventional, and which is not illustrated in the drawings. The conveyor belts travel in the direction of the arrow 29 in FIG. 1.

A pair of nozzles 30 are provided in opposed relation on opposite sides of the conveyor belt to apply hot melt adhesive to areas of the carton blanks B which are to be sealed. The number of such nozzles 30 used is a matter of choice. The carton blanks which are illustrated are provided with a rectangular bottom panel 31 having a pair of side walls 32 hingedly connected to opposite edges thereof, and side wall liner flanges 33 which are to be folded to substantially 180° and adhered onto the surface of the side walls 32. When more conventional cartons are to be adhered along the manufacturer's joint, only one such nozzle would be employed.

Directly beneath each nozzle 30 an adhesive collecting pot 34 is provided. If preferred, the excess adhesive which is extruded through the nozzle 30 may merely drain into this collecting pot and the pot may be emptied from time to time where the amount of excess adhesive is relatively small. However, in preferred form, the adhesive is returned to the main reservoir in a manner which will be later described. The pot 34 is preferably maintained at a temperature above the melting temperature of the adhesive, particularly where the adhesive is to be recirculated.

A roller 35 is supported upon a transversely extending shaft 36 extending into each collecting pot 34 and having its upper peripheral surface directly beneath the nozzle 30. The rollers 35 are supported in closely spaced relation to the under surface of the carton blanks B and may actually contact these blanks. The rollers 35 are rotated by any suitable means such as by the belt 37 which is driven by a suitable motor and engages a pulley 39 on the shaft 36. The roller 35 is preferably rotated in the direction of the arrow 40 or in a clockwise direction as viewed in the drawings. As a result, the upper peripheral surface of the roller rotates in a reverse direction to the direction of travel of the carton blanks. A doctor blade 41 is supported by the collecting pot 34 in contact with the peripheral surface of the roller 35 and acts to remove the adhesive from the surface of this roller. After being stripped from the roller 35, the adhesive drains into the adhesive collecting pot 34 as is indicated in FIG. 2 of the drawings.

When the carton blanks are in closely spaced relation, it has been found practical to merely collect the excess hot melt adhesive in the adhesive pot 34, and to empty the pot from time to time. However, where the blanks B are spaced farther apart, I prefer to use the system illustrated in FIG. 4 drawings. As disclosed in this FIG., the hot melt adhesive is maintained in a heated reservoir 43 which includes suitable heating elements for maintaining the adhesive in a fluid condition. The adhesive is drawn from the reservoir 43 through an outlet 44 and is forced by a pump which is illustrated diagrammatically by the numeral 45 through one or more conduits 46 all leading to the nozzles 30. The flow through the nozzles 30 is controlled by solenoid valves which may be arranged to function automatically in the event the conveyor belts 10 and 11 shall stop their operation. When the solenoid valves are closed, means are provided for returning the adhesive to the reservoir 43. This means is diagrammatically illustrated as including a pressure relief valve 49 in each conduit 46 leading to a nozzle 30, and a return line 50 through which the adhesive may flow in return to the reservoir 43. When excess pressure builds up in the conduits 46 due to the closing of the valves 47, the adhesive will be recycled to the reservoir.

The adhesive collecting pot 34 beneath each nozzle 30 is connected to a return line 51, each of which may be provided with a pump 52 to force the molten adhesive back to the reservoir 43. Valves 53 may be provided in the outlet of the collecting pot 34 to permit the adhesive to collect in the pot if desired when the adhesive is not to be returned directly to the reservoir.

In the past, certain parts of the system described have been employed. In other words, the hot melt adhesive has been held in a molten condition in a reservoir similar to the reservoir 43 and this adhesive has been pumped by suitable pump such as 45 through one or more conduits 46 to a similar number of nozzles 30. These systems have also included the solenoid valves 47 and a valve means for directing the fluid back to the reservoir when the nozzles 47 were closed. Obviously, the solenoid valves could be arranged to automatically open the return line when the line to the nozzles was closed. However, in the past, these systems functioned by opening the nozzles 30 only when a carton blank was passing beneath the nozzle and closing the nozzle in the meantime. As a result, the carton blanks had to travel at a low rate of speed so that the adhesive would be applied over the desired area only. The high viscosity of the adhesive made the intermittent flow of the adhesive very difficult. Furthermore, as the cartons had to travel at a relatively low rate of speed, any slight excess of adhesive or miscalculation of time would cause the excess to cling to the adhesive on the blank forming streamers of adhesive trailing behind the blanks. This excess adhesive would then be transferred to the folding mechanism or other mechanism of the gluing machine and would soon cause considerable difficulty.

In designing the present glue section, the apparatus was tried out before the electronic equipment was added to control the operation of the solenoid valves. As a result, there was a constant stream of adhesive flowing from the nozzles. It was found that by increasing the speed of travel of the blanks, the stream of adhesive would be cut short from the edge of the blank and little of the excessive adhesive remained attached to the blanks. Furthermore, it was found that by providing an adhesive collecting receptacle and adding the rollers 35, the excessive adhesive which remained attached to the blanks could be almost completely removed. Use of the roller is particularly advantageous during periods when the gluer is being started and stopped, for, at this time, there are short periods of time when the carton blanks may not be traveling at sufficient speed to cut off a stream of adhesive.

I claim:

1. An apparatus for applying a hot melt adhesive to a surface of carton blanks including:
   a conveyor for conveying the carton blanks in spaced relation;
   a nozzle;
   a source of supply of hot melt adhesive connected to said nozzle;
   means for forcing adhesive through said nozzle in a substantially constant narrow stream;
   means supporting said nozzle adjacent to said surface of the carton blanks to direct the stream thereupon as the blanks are conveyed;
   a collecting receptacle positioned in aligned relation to said nozzle to collect the adhesive in said stream;
   said receptacle being positioned on the opposite side of the path of movement of said blanks from said nozzle;
   a roller supported on an axis transverse to the movement of said blanks and having its peripheral surface in closely spaced relation to said blanks and on said opposite side of the path of movement of said blanks, the space between said roller and said blanks exceeding the thickness of the stream of adhesive;
   drive means connected to said conveyor for driving said conveyor in a predetermined direction of travel;
   means for removing the adhesive from said roller and depositing it in said receptacle; and
   means rotating said roller in a direction to move said peripheral surface in a direction opposite to the direction of travel of said blanks to break off the stream of adhesive from the trailing edges of said blanks.

2. The structure of claim 1 and including means for directing the adhesive from said receptacle to said source of supply.